(12) United States Patent
Barsness et al.

(10) Patent No.: US 10,162,859 B2
(45) Date of Patent: Dec. 25, 2018

(54) DELAYABLE QUERY

(71) Applicant: International Business Machines Corporation, Armonk, NY (US)

(72) Inventors: Eric L. Barsness, Pine Island, MN (US); Daniel E. Beuch, Rochester, MN (US); Alexander Cook, Rochester, MN (US); Brian R. Muras, Otsego, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/339,645

(22) Filed: Oct. 31, 2016

(65) Prior Publication Data

US 2018/0121505 A1    May 3, 2018

(51) Int. Cl.
*G06F 17/30* (2006.01)
(52) U.S. Cl.
CPC .. *G06F 17/30463* (2013.01); *G06F 17/30469* (2013.01); *G06F 17/30474* (2013.01)
(58) Field of Classification Search
None
See application file for complete search history.

(56) References Cited

U.S. PATENT DOCUMENTS

| | | | |
|---|---|---|---|
| 6,865,567 B1* | 3/2005 | Oommen | G06F 17/30463 |
| 8,655,861 B2 | 2/2014 | Burke et al. | |
| 9,081,898 B1 | 7/2015 | Antova et al. | |
| 2003/0018777 A1* | 1/2003 | Miller | G06Q 30/02 |
| | | | 709/223 |
| 2005/0010558 A1* | 1/2005 | Dettinger | G06F 17/30477 |
| 2008/0082628 A1* | 4/2008 | Rowstron | G06F 17/30442 |
| | | | 709/217 |
| 2013/0262437 A1* | 10/2013 | Abhinkar | G06F 17/30477 |
| | | | 707/718 |
| 2014/0101053 A1* | 4/2014 | Danezis | G06Q 50/06 |
| | | | 705/63 |
| 2016/0092599 A1* | 3/2016 | Barsness | G06F 17/30501 |
| | | | 707/718 |

OTHER PUBLICATIONS

©2015 VMware, Inc., VMware vCloud Air Documentation Center, "Add a Metadata Filter to a Query" <https://pubs.vmware.com/vca/index.jsp?topic=%2Fcom.vmware.vcloud.api.doc_56%2FGUID-74797F3C-576F-4EBC-BA87-599CF22D515A.html>.

* cited by examiner

*Primary Examiner* — Jau-Shya Meng
(74) *Attorney, Agent, or Firm* — Patterson + Sheridan, LLP (57) ABSTRACT

Method and apparatus for query optimization using metadata. A first query associated with a first metadata is received. Upon receiving the first query, the first metadata is compared to predefined criteria, to determine that the first query is delayable. Upon determining that the first query is delayable, a first query plan is generated for the first query based on the first metadata. Upon generating the first query plan, a first schedule for executing the first query plan is generated. The first execution query plan may be scheduled to be executed at a later point in time based on the first metadata. Finally, the first query plan is executed according to the first schedule.

20 Claims, 4 Drawing Sheets

DELAYABLE QUERY

BACKGROUND

The present disclosure relates to database query optimization, and more specifically, to using metadata to mark queries delayable.

A huge variety of applications interact with database management systems (DBMS) in order to achieve their goals. One very common way to interact with a DBMS is using structured query language (SQL) to send queries to the database system. Frequently, these queries are parsed and passed to an optimizer which determines how to best execute the query. These query optimizers usually search for a "good enough" query plan which is the plan that will execute the fastest of all possible plans it considers. Frequently, especially with complex queries, the selected query plan may not be the absolute fastest option, but it would take excessive resources and time to continue to search through the vast number of potential plans, and a query that is "fast enough" is acceptable.

SUMMARY

One embodiment provides a method for query optimization using metadata. The method includes receiving, at a query optimizer, a first query associated with a first metadata. Upon receiving the first query, the method includes determining, by the query optimizer, based on comparing the first metadata to predefined criteria, that the first query is delayable. The method includes generating, by the query optimizer, a first query plan for the first query based on the first metadata. The method also includes generating a first schedule for executing the first query plan. The first execution query plan is scheduled to be executed at a later point in time based on the first metadata. Finally, the method includes executing the first query plan according to the first schedule.

Another embodiment provides a system that includes a computer processor and a memory containing program that, when executed on the computer processor, performs an operation for managing query execution. The operation includes receiving, at a query optimizer, a first query associated with a first metadata. The operation also includes determining, by the query optimizer, based on comparing the first metadata to predefined criteria, that the first query is delayable. Additionally, the operation includes generating, by the query optimizer, a first query plan for the first query based on the first metadata. The operation further includes generating a first schedule for executing the first query plan, wherein at least a portion of the first query plan is scheduled to be executed at a later point in time based on the first metadata, and executing the first query plan according to the first schedule.

Yet another embodiment provides a computer-readable storage medium having computer-readable program code embodied therewith that, when executed by one or more computer processors, performs an operation for managing query execution. The operation includes receiving, at a query optimizer, a first query associated with a first metadata. The operation also includes determining, by the query optimizer, based on comparing the first metadata to predefined criteria, that the first query is delayable. Additionally, the operation includes generating, by the query optimizer, a first query plan for the first query based on the first metadata. The operation further includes generating a first schedule for executing the first query plan, wherein at least a portion of the first query plan is scheduled to be executed at a later point in time based on the first metadata, and executing the first query plan according to the first schedule.

DETAILED DESCRIPTION

Although current query optimizers focus on finding the fastest solution that they can, many queries do not have to be, and should not be, run as fast as is possible. For these queries, it would be a waste of system resources to demand high-speed execution. Additionally, optimizing one query to run quickly can inherently work to the detriment of other queries, because the first query will absorb resources that could instead be used on truly time-sensitive queries.

Some such queries that need not always be run as quickly as possible include batch jobs, jobs that have low priority, or queries where there is no end user awaiting a result (as is the case with reporting queries). Furthermore, some queries may be potentially disruptive if they are executed too quickly, for example, queries that update too much data too quickly may cause replication systems to fall behind.

Figure 1:
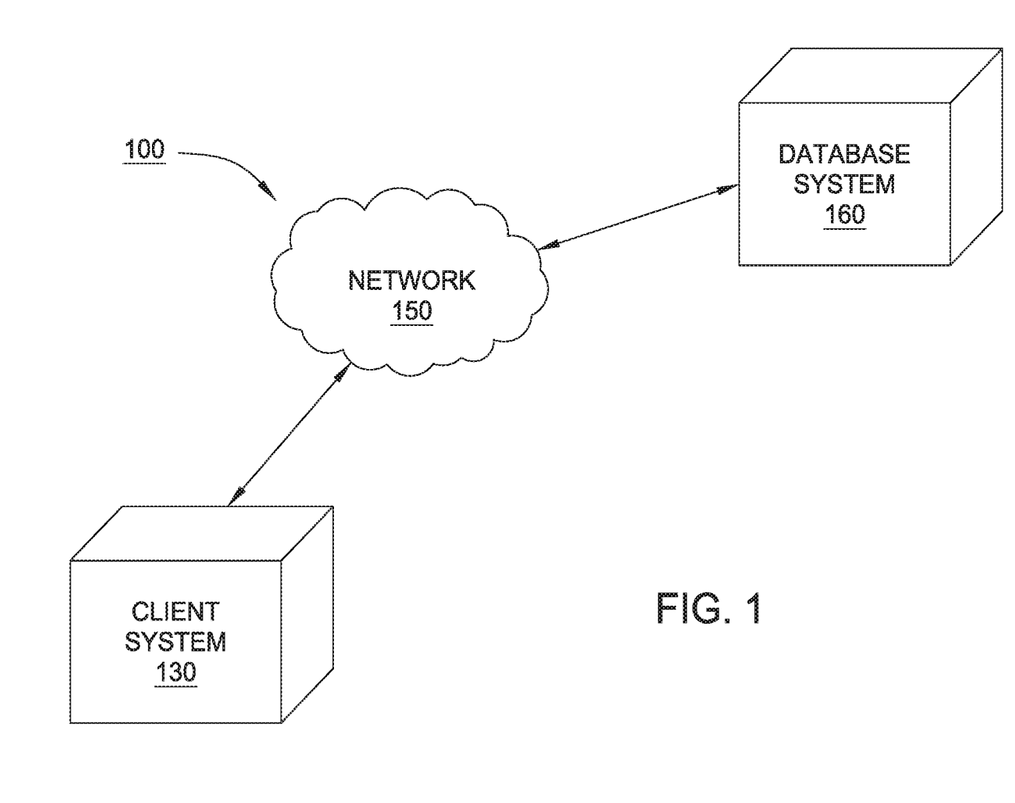
FIG. 1 illustrates a block diagram of a system configured to implement one embodiment of the present disclosure.

FIG. 1 illustrates a system 100 configured to implement embodiments of the present disclosure. In FIG. 1, a Client System 130 is communicatively linked to a Database System 160, for example, through a Network 150. Of course, the Client System 130 and the Database System 160 may communicate over any communication path, for example, the Internet, a local connection, wired or wireless communication, fiber optic connections, or any other method. Generally, the Client System 130 may have one or more threads, jobs, or applications, each of which access data on the Database System 160 through queries. Database System 160 optimizes these queries in order for them to be executed. In the illustrated embodiment, before sending queries to Database System 160, however, Client System 130 or some component therein attaches metadata to the query. This metadata can indicate that the associated query is delayable or can be interrupted. In some embodiments, rather than attaching the metadata to the query on the Client System 130, the metadata may be associated with the query in the Database System 160.

In some embodiments, metadata associated with a query specifies various attributes for the query. For example, rather than simply indicating that the query is delayable, the metadata can specify a class that the query belongs to. In such an embodiment, the Database System 160 or Client System 130 determines whether the query is delayable or interruptible based on this class. For example, the metadata may indicate that the query is part of a batch job, a class of queries having low priority, a reporting query, or another class of queries that do not require immediate and rapid execution. In this embodiment, the Database System 160 may analyze the metadata attached with incoming queries, identify the class that the query belongs to, and determine whether the query is delayable or interruptible, and to what extent it can be delayed or interrupted. In a related embodiment, the Client System 130 may analyze the metadata or query type or class before it is sent to the Database System, and may determine whether the query is delayable or interruptible, as well as to what extent it can be delayed or interrupted.

In a related embodiment, the metadata may include a reference to a particular user, job, thread, or application that the query is associated with. In such an embodiment, the Client System 130 or Database System 160 can similarly analyze the metadata and determine whether the query can be delayed or interrupted. If it can, the system may further determine to what extent it can be delayed or interrupted, e.g., for how long or under what circumstances it can be delayed or interrupted. In some embodiments, the metadata may also include the number of resources the query is expected to require. For example, if metadata, which can be attached to the query on the Client System 130 or Database System 160, indicates that the query will require a large number of table locks, the system can respond appropriately and may delay the query until a later time.

In some embodiments, the metadata also includes a time at which the query needs to be completed and results returned to the requesting entity. For example, a particular application or job may need the query to be completed before 6:00 the next morning, but does not care if it is done before then. In some embodiments, the metadata indicates a period of time that may elapse before results are required. For example, in such an embodiment an application may need the query to be completed within thirty minutes, but does not care how quickly it is done as long as it is finished within the period.

Upon receiving a query with metadata indicating that the query is delayable or interruptible, the Database System 160 can respond in a variety of ways. In some embodiments, the query is optimized to use the minimum amount of resources that can ensure execution is finished by the deadline. In some embodiments, the Database System 160 does not begin to execute the query until a certain time of day, or after a certain period of time has elapsed. Additionally or alternatively, the Database System 160 may delay beginning execution until the system resources are less burdened. In some embodiments, query execution may begin, but the Database System 160 may interrupt execution, place it on hold, and restart and finish execution at a later time. For example, in such an embodiment the Database System 160 may interrupt and delay the execution because a particularly important query is received, and continuing to execute the first query could cause delay. Once the system is less burdened, the execution of the first query can resume.

Figure 2:
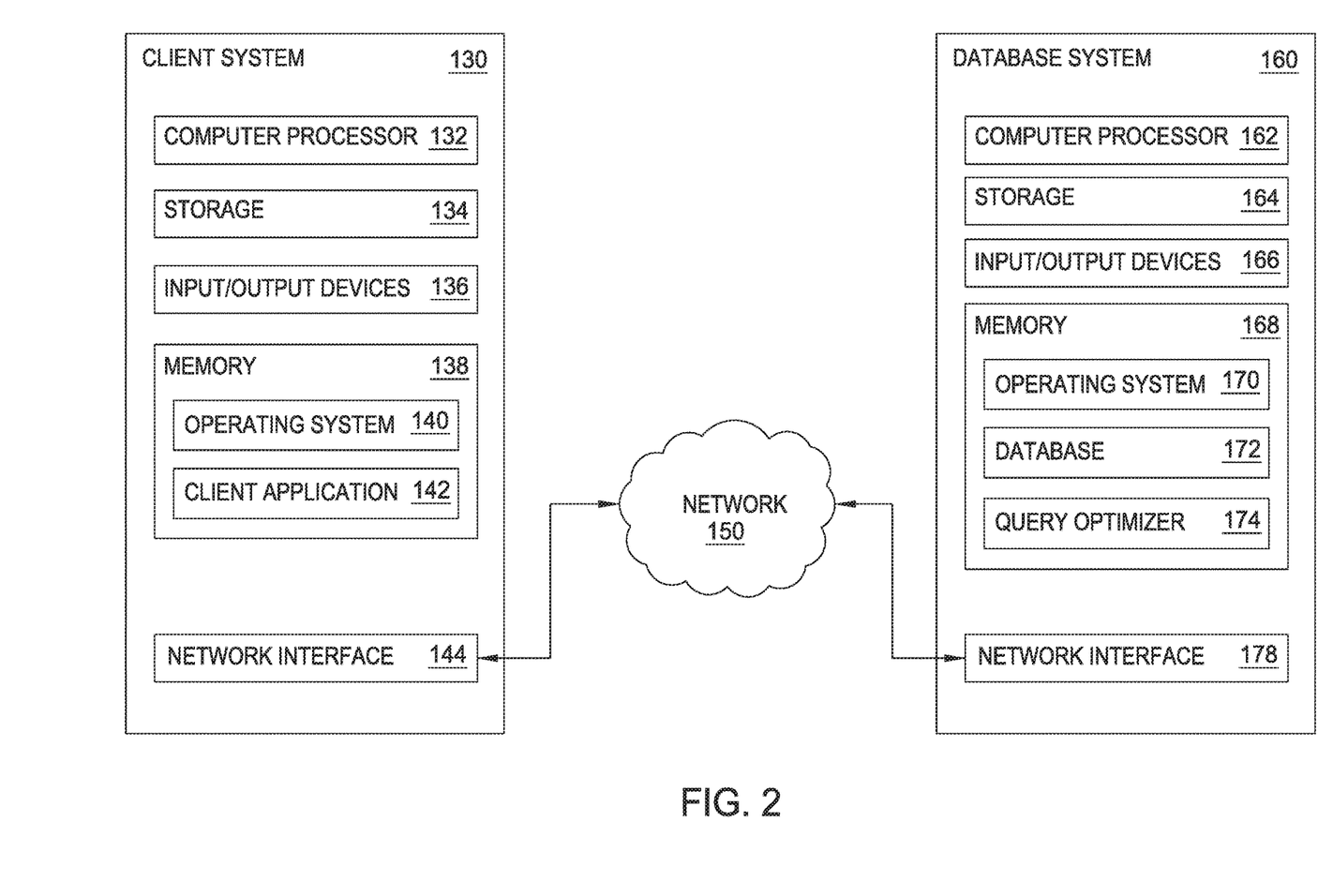
FIG. 2 illustrates a block diagram of a system configured to implement one embodiment of the present disclosure.

FIG. 2 illustrates a block diagram of a system configured to implement embodiments of the present disclosure. In FIG. 2, a Client System 130 communicates with a Database System 160 using a Network 150. Client System 130 contains a Computer Processor 132, Storage 134, Input and Output devices 136, Memory 138, and a Network Interface 144. Memory 138 contains an Operating System 140 and Client Application 142. Although one Client Application 142 is illustrated, a typical Client System 130 may have many such applications running at a given time. As illustrated, Client Application 142 generates queries that are sent to the Database System 160 for execution.

Database System 160 includes Computer Processor 162, Storage 164, Input/Output Devices 166, Memory 168, and Network Interface 178. Memory 168 contains Operating System 170, Database 172, and Query Optimizer 174. Of course, Database 170 may not be entirely contained within Memory 168, and may be stored in another place, such as Storage 164 or in an external space. Database 170 may also be split across various storage medium, if the particular implementation so requires. In the illustrated embodiment, Query Optimizer 174 is configured to analyze metadata associated with incoming queries while generating the query plan. Additionally, the timing of query execution may be adjusted based on the metadata associated with the query.

In one embodiment, the metadata indicates that the query is delayable by a period of time from when it is received. In such an embodiment, the query may be processed in a variety of manners. In some embodiments, the Query Optimizer 174 generates a query plan that will use fewer Database System 160 resources, such as Computer Processor 162 and Memory 168, than if it was optimized to run more quickly. In these embodiments, it may not be possible to determine that the selected query plan is the absolute most resource-efficient, as the number of potential plans may be too large to work through. Thus, Query Optimizer 174 may be configured to determine a resource-optimized query plan similarly to how other optimizers determine time-optimized plans. Rather than search indefinitely for the perfect plan, Query Optimizer 174 may find a "good enough" plan that uses as few resources as is practicable. In each of these embodiments, Query Optimizer 174 selects a query plan that can ensure execution will be completed before the indicated time has elapsed.

In order to determine when a query plan is "good enough," a variety of methods may be used by the system. In some embodiments, the Query Optimizer 174 is configured to spend a fixed amount of time determining various plans. In such an embodiment, the Query Optimizer 174 selects the best plan after the time has elapsed, where the best plan is the plan that will require the fewest resources, or cause the least burden to other processes or queries. In some embodiments, the Query Optimizer 174 is configured to expend a fixed amount of resources while generating various query plans. Once those allocated resources have been expended, the Query Optimizer 174 similarly selects the best plan that has been created. In other embodiments, Query Optimizer 174 is configured to continue generating query plans until one is found that is sufficiently efficient. In such an embodiment, the Query Optimizer 174 may disregard all other time or resource limits, or may be similarly limited to spend no more than a fixed amount of time or resources. In order to determine whether a generated query plan is sufficiently efficient, the Query Optimizer 174 may compare it to predefined criteria including the time it will take to execute, the resources that will be consumed or used, the effect the query will have on the burden on the Database System 160, or any other factor that affects whether a query is efficient or not.

In some embodiments where the associated metadata indicates that the query is delayable by a period of time, Query Optimizer 174 may not begin processing the query until some period of time has elapsed, and then optimize the query at some future point in time after receiving the query. Alternatively, Query Optimizer 174 may begin to optimize the query immediately, but Database System 160 does not begin the execution of the selected plan until some period of time has elapsed. For example, in such an embodiment the query may be optimized to execute quickly, but based on the metadata indicating that it is delayable, execution of the plan may be postponed until a later time in order to avoid burdening the Database System 160.

In one embodiment, the metadata associated with a query indicates that the query needs to be completed by a certain time of day. In such an embodiment, the query may be treated similarly to how queries that need to be completed within a period of time are treated. For example, Query Optimizer 174 may be configured to create a query plan using just enough resources to complete execution by the time. Additionally, Database System 160 may delay processing the query, and may begin optimization only after some time has elapsed. In addition, in some embodiments Query Optimizer 174 is configured to optimize the query when it is received, but Database System 160 does not proceed to begin execution of the query until some period of time has elapsed.

In one embodiment, the query's metadata indicates that execution of the query can be stopped and placed on hold, and then restarted and completed at a later time. In such an embodiment, a query with metadata indicating that it is delayable may begin execution, but the Database System 160 may determine that continuing to execute the query plan may burden other processes. For example, another query that will require a large number of resources may be received, such that continuing execution of the first query will force delay of the second query. In this embodiment, because the first query is associated with metadata that indicates that it is interruptible, the first query can be stopped and placed on hold while the second query executes. After the Database System 160 determines that the first query can resume execution without unduly burdening the system, it can be restarted and completed. The Database System 160 may also determine that the query needs to be interrupted because of changes in the system resources, for example Computer Processor 162 may be affected by some unrelated process, or a portion Storage 164 and/or Memory 168 may be removed temporarily.

In one embodiment, metadata is associated with a set of queries from a single job or thread, or with the job or thread itself. In this embodiment, the metadata indicates a throttle or limit on the number of queries that should be processed in a given timeframe. The metadata may indicate that queries coming from the specified job, thread, or application should be executed at a given rate, and if queries are received faster than that rate, they should be delayed as necessary. For example, the metadata may indicate that queries from a specific job should not be executed faster than one query per second. In some embodiments, the metadata may indicate that some types of queries are throttled while others are not, or that various types should be throttled differently. For example, a thread may be limited to one "write" query per second, but may be allowed ten "read" queries per second. These embodiments allow things like batch jobs that require a large number of update queries to run with queries staggered or throttled over a period of time as opposed to executing them all as quickly as possible. In a related embodiment, the metadata may indicate that the queries should be throttled, but that they still need to be completed within a period of time or by a specified time of day. For example, in such an embodiment, the metadata may indicate that all queries from the job need to be completed by 6:00 am, but that they may be throttled as needed to avoid burdening the Database System 160 unnecessarily.

In one embodiment, the Query Optimizer 174 or another component on Database System 160 considers the effect that a resource-efficient slower query plan will have on other jobs. For example, if the query will lock a large number of rows, optimizing it to execute with minimum resources such as Memory 168 or Computer Processor 162 may cause other queries to be delayed unnecessarily while they wait for the first query to unlock the affected rows. In such an embodiment, the Database System 160 may respond in a variety of ways. In some embodiments, Query Optimizer 174 optimizes the query to execute as quickly as possible, using extra resources if required, but delays actual execution until it will not affect other jobs. For example, query execution may be delayed to a time of day when historically few queries are received. Additionally or alternatively, execution may begin when the Database System 160 is receiving few other queries, regardless of the time of day.

Figure 3:
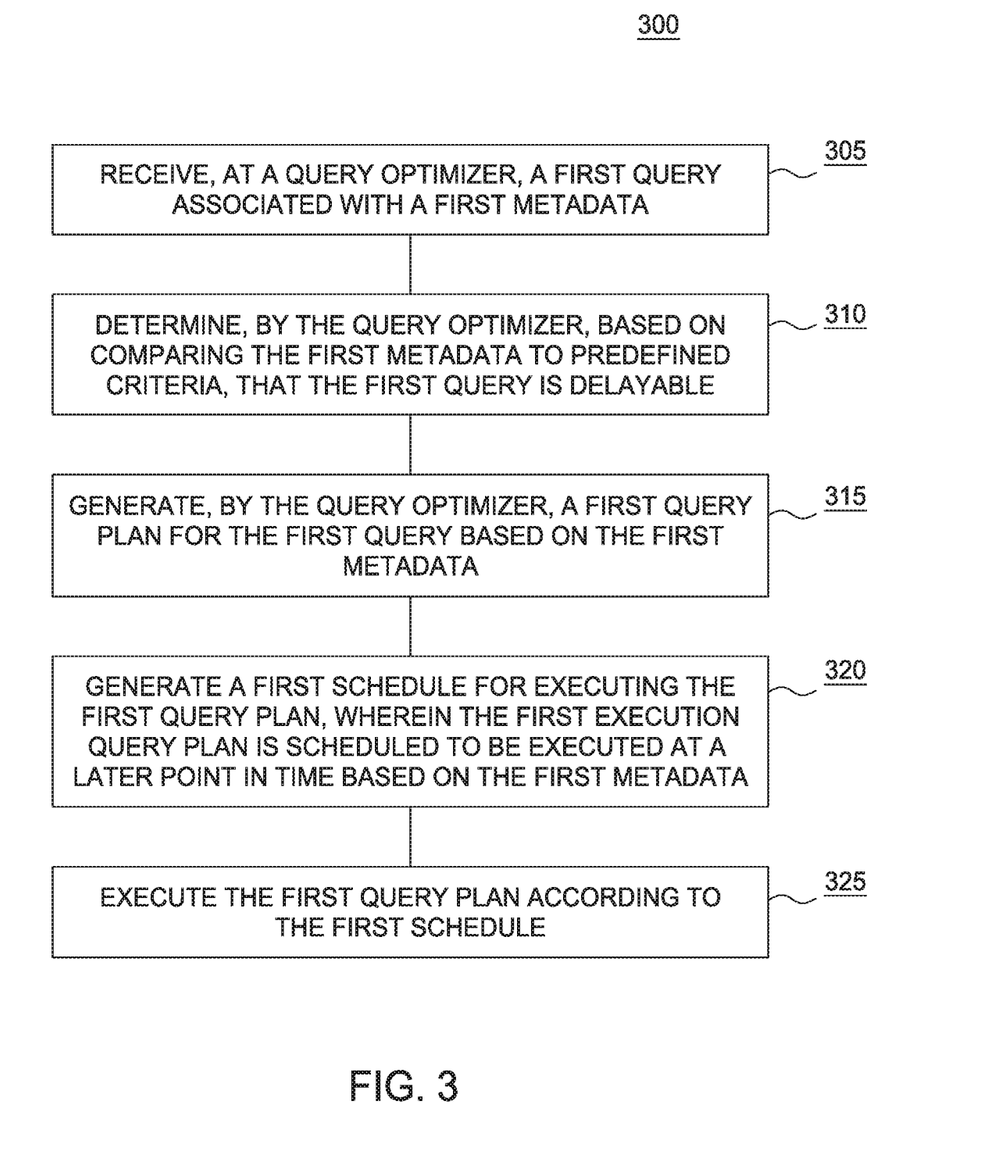
FIG. 3 is a flow diagram illustrating a method for query optimization, according to one embodiment of the present disclosure.

FIG. 3 illustrates a flow diagram for a method 300 for query optimization according to one embodiment herein. The method 300 begins at block 305, where a query optimizer receives a first query associated with a first metadata. The method 300 continues at block 310, where the query optimizer determines, based on comparing the first metadata to predefined criteria, that the first query is delayable. For example, the query optimizer could determine a type of the first query and could determine whether queries of the particular type are configured to be delayable. As another example, the query optimizer could determine a user submitting the query and could determine whether queries submitted by the particular user are delayable. In doing so, the query optimizer could consider a current system workload of the database system as well as a relative priority of the query in question (e.g., as determined based on the first metadata).

At block 315, the query optimizer generates a first query plan for the first query based on the first metadata. The method 300 then moves to block 320, where a first schedule for executing the first query plan is generated, wherein the first execution query plan is scheduled to be executed at a later point in time based on the first metadata. In doing so, the query optimizer can determine a schedule that indicates that various portions of the first query plan are to be executed at respective subsequent moments in time. In doing so, the query optimizer can be configured to consider the database system's historical workload when selecting the subsequent moments in time. As an example, when generating the schedule for a relatively low priority, resource-intensive query, the query optimizer can schedule the query for execution at a relatively off-peak time of day, rather than immediately executing the low priority query. Moreover, using such a schedule, the query optimizer can schedule portions of the query for execution across a window of time (as opposed to executing the entirety of the query plan immediately). The method 300 concludes at block 325, where the first query plan is executed according to the first schedule.

Figure 4:
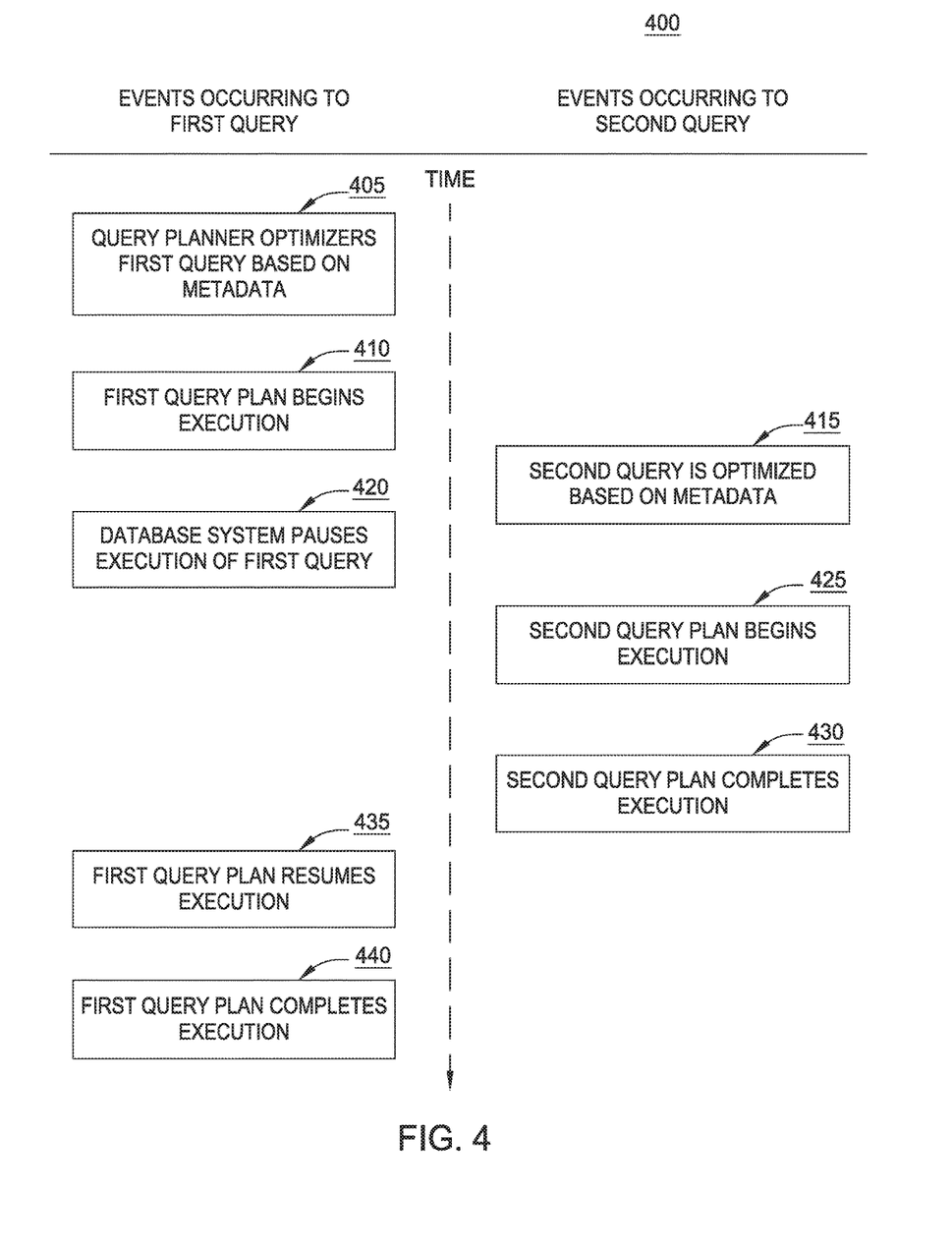
FIG. 4 is a flow diagram illustrating the steps that occur during execution of multiple queries, according to one embodiment of the present disclosure.

FIG. 4 illustrates a flow diagram showing the steps that occur in one embodiment of the present invention as queries are optimized and processed. In the illustrated embodiment, events that occur to the first received query are shown on the left, and events occurring to the second received query are shown on the right. Time is illustrated as events move down the page. The first event occurs at block 405, where the first query is received and optimized based on its attached metadata. At block 410, the database system begins execution of the first query using the first query plan. At block 415, a second query is received by the database system and a query plan is optimized using the metadata associated with the second query.

In the illustrated embodiment, the system determines that the first query should be interrupted. This determination could be made in any of the manners described herein. For example, the second query may have a higher priority than the first query, and the system may determine that the first query will burden and slow the first query if both execute concurrently. Alternatively, the first query may have no urgent deadline, but may use a large number of resources and thus can be paused without harm. In any event, the database system interrupts the first query at block 420 and places it on hold. The second query plan is then executed at block 425. At block 430, the second query plan finishes execution. After the second query has finished execution, the first query plan resumes execution at 435. Finally, at block 440, the first query plan finishes execution.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a database system) or related data available in the cloud. For example, the database management system could execute on a computing system in the cloud. In such a case, the database system could optimize queries based on attached metadata and store data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving a first query at a query optimizer executing by operation of one or more computer processors;
determining a first metadata describing one or more attributes of the first query;
determining, by the query optimizer, based on comparing the first metadata to predefined criteria, that the first query is delayable when one or more system attributes satisfy one or more predefined conditions;
generating, by the query optimizer, a first query plan for the first query based on the first metadata, and further based on the determination that the first query is delayable;
generating a first schedule for executing the first query plan, wherein at least a portion of the first query plan is scheduled to be executed at a later point in time based on the first metadata;
beginning execution of the first query plan according to the first schedule;
generating, by the query optimizer, a second query plan for executing a second query;
upon determining that the second query has a higher priority than the first query and that continuing execution of the first query plan will delay completion of the second query plan, pausing execution of the first query plan;
completing execution of the second query plan; and
restarting execution of the first query plan.

2. The method of claim 1, wherein the first metadata comprises an expiration time, and wherein the preferred query plan is optimized to use a minimum amount of system resources required to finish the preferred query plan before the expiration time.

3. The method of claim 2, wherein the expiration time comprises a time of day.

4. The method of claim 2, wherein the expiration time comprises a length of time that may pass before the first query expires.

5. The method of claim 1, wherein the first metadata indicates that the first query is associated with a first job, and wherein the query optimizer is configured to restrict the number of queries that are associated with the first job that are executed in a specified timeframe, wherein restricting the number of queries comprises limiting queries that change data in a database based on a first predefined limit, and limiting queries that read data in the database based on a second predefined limit, wherein the first predefined limit is more restrictive than the second predefined limit.

6. The method of claim 1, wherein determining the preferred query plan is further based on determining that the first query could affect a second query, and wherein the first query plan is optimized to delay execution of the first query until the second query will not be affected.

7. The method of claim 1, wherein the first metadata comprises an attribute about at least one of: (a) a user associated with the first query, (b) a class of the first query, (c) a job with which the first query is associated, (d) a thread with which the first query is associated, and (d) an application with which the first query is associated.

8. A system, comprising:
a computer processor; and
a memory containing program that, when executed on the computer processor, performs an operation for managing query execution, the operation comprising:
receiving a first query at a query optimizer;
determining a first metadata describing one or more attributes of the first query;
determining, by the query optimizer, based on comparing the first metadata to predefined criteria, that the first query is delayable when one or more system attributes satisfy one or more predefined conditions;
generating, by the query optimizer, a first query plan for the first query based on the first metadata, and further based on the determination that the first query is delayable;
generating a first schedule for executing the first query plan, wherein at least a portion of the first query plan is scheduled to be executed at a later point in time based on the first metadata;
beginning execution of the first query plan according to the first schedule;
generating, by the query optimizer, a second query plan for executing a second query;
upon determining that the second query has a higher priority than the first query and that continuing execution of the first query plan will delay completion of the second query plan, pausing execution of the first query plan;
completing execution of the second query plan; and
restarting execution of the first query plan.

9. The system of claim 8, wherein the first metadata comprises an expiration time, and wherein the preferred query plan is optimized to use a minimum amount of system resources required to finish the preferred query plan before the expiration time.

10. The system of claim 9, wherein the expiration time comprises a time of day.

11. The system of claim 9, wherein the expiration time comprises a length of time that may pass before the first query expires.

12. The system of claim 8, wherein the first metadata indicates that the first query is associated with a first job, and wherein the query optimizer is configured to restrict the number of queries that are associated with the first job that are executed in a specified timeframe, wherein restricting the number of queries comprises limiting queries that change data in a database based on a first predefined limit, and limiting queries that read data in the database based on a second predefined limit, wherein the first predefined limit is more restrictive than the second predefined limit.

13. The system of claim 8, wherein determining the preferred query plan is further based on determining that the first query could affect a second query, and wherein the first query plan is optimized to delay execution of the first query until the second query will not be affected.

14. The system of claim 8, wherein the first metadata comprises an attribute about at least one of: (a) a user associated with the first query, (b) a class of the first query, (c) a job with which the first query is associated, (d) a thread with which the first query is associated, and (d) an application with which the first query is associated.

15. A computer-readable storage medium having computer-readable program code embodied therewith, that, when executed by one or more computer processors, performs an operation for optimizing queries, the operation comprising:
receiving, at a query optimizer, a first query;
determining a first metadata describing one or more attributes of the first query;
determining, by the query optimizer, based on comparing the first metadata to predefined criteria, that the first query is delayable when one or more system attributes satisfy one or more predefined conditions;
generating, by the query optimizer, a first query plan for the first query based on the first metadata, and further based on the determination that the first query is delayable;
generating a first schedule for executing the first query plan, wherein at least a portion of the first query plan is scheduled to be executed at a later point in time based on the first metadata;
beginning execution of the first query plan according to the first schedule;
generating, by the query optimizer, a second query plan for executing a second query;
upon determining that the second query has a higher priority than the first query and that continuing execution of the first query plan will delay completion of the second query plan, pausing execution of the first query plan;
completing execution of the second query plan; and
restarting execution of the first query plan.

16. The computer-readable storage medium of claim 15, wherein the first metadata comprises an expiration time, and wherein the preferred query plan is optimized to use a minimum amount of system resources required to finish the preferred query plan before the expiration time.

17. The computer-readable storage medium of claim 16, wherein the expiration time comprises a time of day.

18. The computer-readable storage medium of claim 16, wherein the expiration time comprises a length of time that may pass before the first query expires.

19. The computer-readable storage medium of claim 15, wherein the first metadata indicates that the first query is associated with a first job, and wherein the query optimizer is configured to restrict the number of queries that are associated with the first job that are executed in a specified timeframe, wherein restricting the number of queries comprises limiting queries that change data in a database based on a first predefined limit, and limiting queries that read data in the database based on a second predefined limit, wherein the first predefined limit is more restrictive than the second predefined limit.

20. The computer-readable storage medium of claim 15, wherein determining the preferred query plan is further based on determining that the first query could affect a second query, and wherein the first query plan is optimized to delay execution of the first query until the second query will not be affected.

* * * * *